US007169468B2

(12) United States Patent
Miura et al.

(10) Patent No.: US 7,169,468 B2
(45) Date of Patent: Jan. 30, 2007

(54) RESIN BONDED RARE EARTH MAGNET

(75) Inventors: Toshihiko Miura, Shizuoka-ken (JP); Masahito Kawasaki, Shizuoka-ken (JP); Shunji Suzuki, Shizuoka-ken (JP); Shuichi Nishida, Shizuoka-ken (JP)

(73) Assignee: Minebea Co., Ltd, Nagano-Ken (JP)

( * ) Notice: Subject to any disclaimer, the term of this patent is extended or adjusted under 35 U.S.C. 154(b) by 0 days.

(21) Appl. No.: 09/419,798

(22) Filed: Oct. 18, 1999

(65) Prior Publication Data

US 2003/0012948 A1 Jan. 16, 2003

(30) Foreign Application Priority Data

Oct. 16, 1998 (JP) ................................ 10-295925

(51) Int. Cl.
*B32B 5/16* (2006.01)
*B05D 5/00* (2006.01)

(52) U.S. Cl. ...................... 428/323; 428/328; 428/409; 428/900; 428/928; 427/127; 427/130; 427/131

(58) Field of Classification Search ................ 428/332, 428/900, 928
See application file for complete search history.

(56) References Cited

U.S. PATENT DOCUMENTS 3,998,669 A * 12/1976 Strnat ......................... 428/558
5,154,978 A * 10/1992 Nakayama et al. ......... 428/469
5,273,782 A * 12/1993 Sagawa et al. ............. 427/242
6,211,584 B1 * 4/2001 Kurosawa et al. .......... 428/900

FOREIGN PATENT DOCUMENTS

JP 9-205013 8/1997

* cited by examiner

*Primary Examiner*—Monique R. Jackson
(74) *Attorney, Agent, or Firm*—Ladas & Parry LLP

(57) ABSTRACT

A resin bonded rare earth magnet, compression molded from rare earth-transition alloy powder and thermosetting resin, having a magnet 1 comprising a mixture of thermosetting resin and rare earth-transition alloy powder with a particle size of between 20 and 300 microns, a filling material 3 with particle size between 0.1 and 15 microns which is used to fill in the depressions 2 on the surface of said magnet 1 and is then fixed with said thermosetting resin, and a corrosion inhibiting coat 4 made from synthetic resin applied to the surface of said magnet 1 which has been rendered smooth by the application of said filling material into the depressions on its surface.

3 Claims, 5 Drawing Sheets

| ROUGHNESS Ra ( μm ) | 1.2 | 1.8 | 2.3 | 2.7 | 3.6 | 4.4 |
|---|---|---|---|---|---|---|
| THE AMOUNT OF CORROSION PRESENT* | O | O | O | O | Δ | X |

* (SYMBOLS USED IN THE ABOVE CHART:
O: NO CHANGE, Δ : SOME SWELLING, X : RED RUSH PRESENT)

| SAMPLE NAMES | MAGNETIC POWDER PARTICLES SIZE (µm) | THE MASS OF EPOXY (MASS %) | $BH_{MAX}$ (kJ/m³) | SURFACE ROUGHNESS Ra (µm) | OCCURRENCE OF CORROSION * |
|---|---|---|---|---|---|
| SAMPLE (a) | 10 or less | 3.0 | 73.5 | 1.0 | O |
| SAMPLE (b) | 20 - 45 | 2.6 | 85.4 | 1.2 | O |
| SAMPLE (c) | 45 - 105 | 2.2 | 87.8 | 1.7 | O |
| SAMPLE (d) | 45 - 180 | 2.0 | 88.1 | 2.1 | O |
| SAMPLE (e) | 45 - 300 | 1.8 | 88.3 | 2.6 | O |
| SAMPLE ( f ) | 45 - 500 | 1.6 | 88.1 | 3.9 | Δ |

* (SYMBOLS USED IN THE ABOVE CHART:
O: NO CHANGE, Δ : SOME SWELLING, X : RED RUSH PRESENT)

F I G. 5

| SAMPLE NAMES | $SiO_2$ POWDER (μm) | SURFACE ROUGHNESS Ra (μm) | OCCURRENCE OF CORROSION * |
|---|---|---|---|
| SAMPLE (g) | 0.05 | 3.4 | Δ |
| SAMPLE (f) | 0.1 | 2.7 | O |
| SAMPLE (i) | 0.5 | 1.8 | O |
| SAMPLE (j) | 2 | 1.3 | O |
| SAMPLE (k) | 10 | 1.7 | O |
| SAMPLE (l) | 15 | 2.5 | O |
| SAMPLE (m) | 20 | 3.8 | X |

* (SYMBOLS USED IN THE ABOVE CHART:
O: NO CHANGE, Δ : SOME SWELLING, X : RED RUSH PRESENT)

FIG. 6

| SAMPLE NAMES | MOLDING PRESSURE (GPa) | MAGNET DENSITY ( $x10^3$ $kg/m^3$ ) | $BH_{MAX}$ ( $kJ/m^3$ ) | SURFACE ROUGHNESS Ra ( μm ) | OCCURRENCE OF CORROSION * |
|---|---|---|---|---|---|
| SAMPLE (n) | 0.6 | 5.84 | 103 | 4.1 | × |
| SAMPLE (o) | 0.8 | 6.04 | 118 | 3.3 | Δ |
| SAMPLE (p) | 1.0 | 6.17 | 132 | 2.2 | O |
| SAMPLE (q) | 1.2 | 6.28 | 141 | 1.6 | O |
| SAMPLE (r) | 1.4 | 6.36 | 149 | 1.4 | O |
| SAMPLE (s) | 1.6 | 6.48 | 154 | 1.3 | O |

* (SYMBOLS USED IN THE ABOVE CHART:
O: NO CHANGE, Δ : SOME SWELLING, × : RED RUSH PRESENT)

F I G. 7

RESIN BONDED RARE EARTH MAGNET

BACKGROUND OF THE INVENTION

1. Field of the Invention

The present invention provides a resin bonded rare earth magnet with superior corrosion resistance due to suppression of roughness on the surface of the magnet.

2. Description of the Prior Art

Rare earth magnets made from rare earth metals and transition metals have found widespread use in recent years due to the remarkable superiority of their magnetic characteristics compared to ferrite or Alnico magnets. However, because Nd—Fe—B rare earth magnets easily oxidize under the condition of high temperature and high humidity, resulting in the formation of rust and degradation of magnetic characteristics, resin or metallic coatings have been applied to the magnet surface to inhibit oxidation. Especially for bonded magnets made from Nd—Fe—B quenched powder and organic resin, it has been customary to use spraying or electrolytic deposition to apply a resin coating or nickel plating to the surface of the molded body.

In rare earth bonded magnets, which are mainly used in PM stepping motors or the spindle motors for CD-ROM drives, high quality is required for magnetic characteristics and corrosion resistance in order to achieve more compact size and lower power consumption. Especially, as the storage density of hard disk drives increases, this is accompanied by requirements for cleaner and faster spindle motors, and accordingly it has become important that the magnets mounted in such motors have sufficient corrosion resistance and strength, and are free from adhering organic particles, etc.

Conventionally, the surface of bonded magnets is coated with epoxy or acrylic resin to improve corrosion resistance. However, because magnetic particles of irregular sizes ranging from a few tens to a few hundreds of microns in diameter are fixed in a small quantity of resin bond, there will be a large number of protrusions or depressions in the surface of the magnet. Because of this, the thickness of the coating will not be even and the smoothness of the surface cannot be ensured. Defects such as pinholes and air bubbles easily occur, which will lead to deterioration of the corrosion resistance. Moreover, since the coating may not fully cover some projecting magnetic particles which are exposed at the magnet surface, such particles may break off during the rotation of a spindle motor and cause interference with the rotation.

To overcome this problem, attempts have been made to use magnetic particles having a particle size of 10 microns or less to minimize roughness on the magnet surface. However in this case the magnetic density produced by compression molding is insufficient and the desired magnetic characteristics cannot be obtained. It is also impossible to greatly reduce the roughness on the surface of the magnet by improving the methods of forming the coating using coating or electrolytic deposition. Accordingly, a thick film coating with a thickness of several tens of microns must be employed in order to achieve sufficient corrosion resistance. However, if such a magnet coated by a thick film is used in a spindle motor, because of the thickness of the coating, the effective magnetic flux per volume of the magnet will be reduced, which is inconvenient for the motor characteristics. In these circumstances, there is a requirement for a powerful resin bonded rare earth magnet with good corrosion resistance, in which the roughness of the magnet surface has been suppressed.

In view of the conditions described above, the present invention has the objective of providing a resin bonded rare earth magnet, compression molded from rare earth-transition metal powder and thermosetting resin, in which a corrosion inhibiting coating made from synthetic resin which covers the surface of the compression molded magnet is made as thin as possible while preventing the occurrence of defects such as air bubbles and pinholes.

SUMMARY OF THE INVENTION

In order to achieve the above-mentioned objective, the main present invention provides a resin bonded rare earth magnet, compression molded from rare earth-transition metal powder and thermosetting resin, having a magnet comprising a mixture of thermosetting resin and rare earth-transition metal powder with a particle size of between 20 and 300 microns, a filling material with particle size between 0.1 and 15 microns which is used to fill in the depressions in the surface of said magnet body and is then fixed with resin, and a corrosion inhibiting coat made from synthetic resin applied to the surface of said magnet which has been rendered smooth by the application of said filling material into the depressions in its surface.

The second present invention provides a resin bonded rare earth magnet according to the above mentioned main present invention, having the characteristic that said filling material, used to fill the depressions on the surface of said magnet, employs a thermosetting resin to fixed the filling material in the depressions.

The third present invention provides a resin bonded rare earth magnet according to main present invention, having the characteristic that the corrosion inhibiting coat made from synthetic resin applied to the surface of said magnet has a thickness of between 1 and 30 microns.

BRIEF DESCRIPTION OF THE DRAWINGS

FIG. 5 is a table giving the results of example of execution 1.

FIG. 6 is a table giving the results of example of execution 2.

FIG. 7 is a table giving the results of example of execution 3.

DETAIL DESCRIPTION OF THE SEVERAL VIEWS OF THE DRAWINGS

The following explanation will describe how the present invention achieves a resin bonded rare earth magnet with a remarkably small amount of roughness on the magnet surface. The rare earth alloy used in the present invention employs rare earth transition metal powder such as Nd—Fe—B made using the melt quenching method, or made using hydrogen adsorption (by the method known as HDDR) Sm—Fe—N or Sm–Co, etc. A particle size between several microns and several hundreds of microns may be used, but the present invention requires a size of 20 to 300 microns. With particles smaller than 20 microns, the required density cannot be obtained without very greatly increasing the forming pressure employed in the compression molding process and accordingly the desired magnetic characteristics are hard to obtain and mold breakages are common. With particles over 300 microns in size, the roughness of the magnet surface becomes very great, the roughness are extremely difficult to smooth away and the external appearance is degraded.

Solid or liquid resin such as epoxy, phenol, melamine, etc. may be used as the thermosetting resin to be mixed with the above described magnetic powder, and, using the compression molding method, the ratio of the mixture is normally within the range 1 to 5% by weight of resin to magnetic powder. Other additives used may include silane coupling agent to improve the coupling between metal and resin, and fatty acids or their salts in order to improve the lubrication during forming. Normally available equipment may be used to process the magnetic powder, resin and additives by mixing, stirring, powdering and other processes, and shaping the body by filling in a metal mold to obtain the magnet illustrated in FIG. 1. Further, by selection of alloy powder and forming in a magnetic field, an anisotropic magnet body can be obtained.

Several methods, as described below, may be employed to achieve a smooth molded magnet body with little surface roughness. Increasing the ratio of resin to magnetic powder will reduce air holes in the molded body surface. By adding lubricating additives such as fatty acids, or by coating the mold with a lubricating agent such as boron nitride, friction at the molded body surface may be reduced. And using a high density filling of magnetic powder reduces air holes in and around the molded body.

Figure 1:
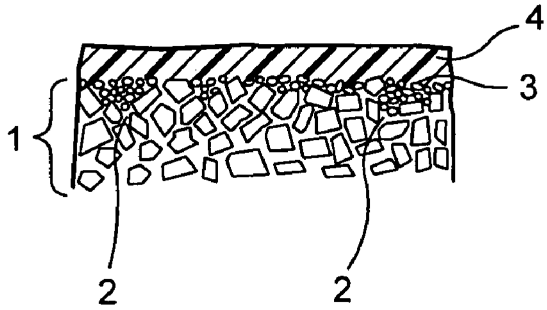
FIG. 1 is a cross sectional view of a resin bonded rare earth magnet as related by the present invention.

Further, as shown in FIG. 1, by filling the depressions 2 in the surface of magnet body 1 with inorganic filler material 3, roughness on the surface can be reduced to obtain a smooth, level surface. Examples of inorganic filler materials that may be used are oxides such as Al2O3, SiO2 and TiO2, various kinds of carbides, borides, nitrides and sulfides, and also graphite and other corrosion resistant metal or alloy powders. In order to fill the spaces between the magnetic particles, the particle size of the filler must be within the range 0.1 to 15 microns in order to achieve the objective of a surface roughness Ra of 3 microns or less. If the size is less than 0.1 micron, there will be a tendency for the filler to accumulate on the level surfaces as well as in the spaces between particles, and thus the effect will be the reverse of that intended and the surface will actually become rougher. Small particles will also float off easily into the air, making handling more difficult. On the other hand, filler particles over 15 microns in size will fill in only the larger of the spaces between magnetic particles and leave smaller spaces empty, thus the objective of a surface roughness Ra of 3 or less microns will not be achieved.

Figure 2:
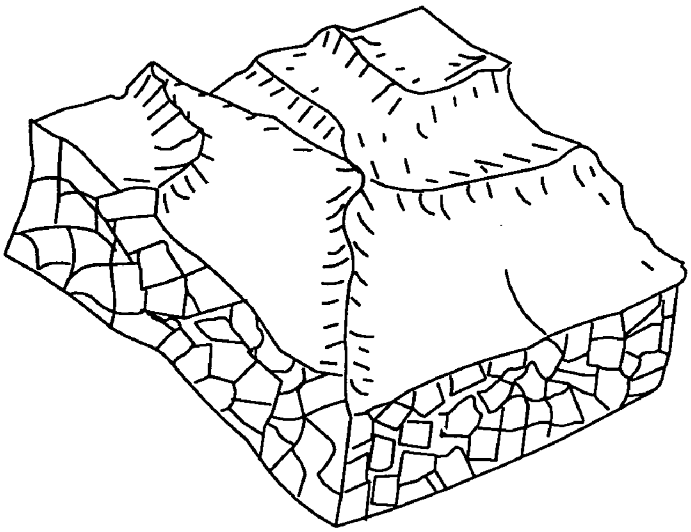
FIG. 2 is a perspective view showing the roughness on the surface of the magnet body.
Figures 3, 4:
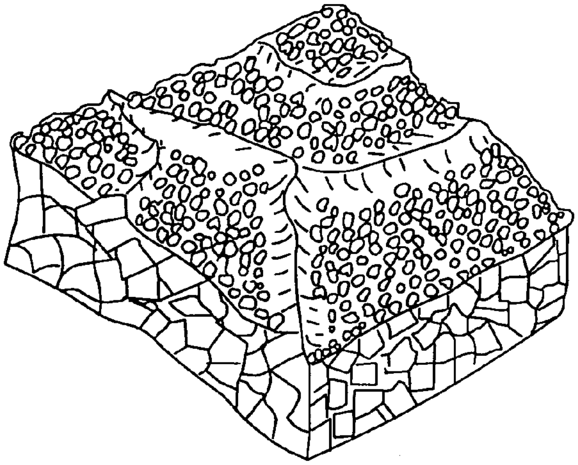
FIG. 3 is a perspective view showing the said roughness on the surface of the magnet having been filled with filling material.
FIG. 4 is a table showing the relationship between surface roughness and the occurrence of corrosion.

As an example of a filling method to be used for inorganic filling material 3, TiO2 powder of 1.5 micron particle size is mixed with powdered epoxy resin at room temperature in a 1:1 ratio. This mixture is placed, together with the molded magnet body and alumina balls in a pot, where ball milling occurs for 10 minutes. Next, the molded magnet body, the surface of which has been filled by the TiO2 and epoxy powder filler, is shaken on a vibrating sieve to remove the excess filling agent. Epoxy curing is then performed by heating at 120 to 150° C. for 30 minutes, which fixes the TiO2 on the surface of the molded body. Other possible methods include the use of liquid thermosetting resin and the use of other types of mixing machines to replace ball milling. FIGS. 2 and 3 show the surface of the molded magnet body before and after filling with powders TiO2. It can be seen that the result of this process is to greatly reduce irregularities and air holes in the surface of the sample. The surface roughness of this sample before filling was 4.1 microns, and after filling the Ra was 1.8 microns.

In the case of resin bonded rare earth magnets, a corrosion inhibiting coat 4 of thickness between 1 and 30 microns is normally applied to the surface of magnet body 1 using spray coating, electrolytic deposition, nickel plating etc., for the purpose of improving the corrosion resistance of said surface and for preventing magnetic particles coming free from said surface. In this case, the surface roughness after the corrosion inhibiting coat is applied depends on the surface roughness of the molded body, and if the surface of magnet body 1 is smooth and level, then necessarily the surface after application of the corrosion inhibiting coat will also be smooth and level, the roughness value Ra being approximately the same before and after applying said coat. Furthermore, high temperature and high humidity test results show that the corrosion resistance will become greater as the surface roughness after application of the corrosion inhibiting coat becomes smaller, and accordingly it can be seen that as the surface roughness becomes smaller, the coating required can be made thinner.

To achieve the objective of the present invention of providing a highly corrosion resistant magnet, it is necessary that the surface roughness Ra of the magnet surface be less than 3 microns after the corrosion inhibiting coat has been applied. If the roughness exceeds 3 microns, the depressions and projections on the magnet will be too large to be smoothed out by the application of filling agent and the corrosion inhibiting coat, and so corrosion resistance cannot be assured.

FIG. 4 shows the relationship between surface roughness Ra of an Nd—Fe—B type bonded magnet and the occurrence of corrosion. Magnet samples of different roughnesses were prepared by varying the amount of TiO2 and powdered epoxy filling applied to the surface of a cylindrical molded body having a diameter of 12 mm and a length of 10 mm, a 20 micron thick epoxy coating then being sprayed onto this. The surface roughness was then measured using a surface roughness tester. Corrosion resistance was evaluated by the amount of corrosion present after 500 hours exposure to high temperature and high humidity (70° C. and 95% RH). (Symbols used in FIG. 4: ○; no change, Δ; some swelling, X; red rust present)

As can be seen from FIG. 4, the amount of surface roughness affects the corrosion resistance of the magnet samples, with the desired corrosion resistance being assured when Ra is 2 microns or less. Furthermore, when a magnet with small surface roughness is given a uniform coating over the entire magnet surface, this will eliminate the danger of particles breaking loose during the work of mounting the magnet or assembling the motor, thus making it ideal for hard disk drive motors which require especially clean operating environments. Below, the present invention will be described in greater detail through various examples of execution.

EXAMPLE OF EXECUTION 1

Quenched flakes of Nd—Fe—B are pulverized to obtain powder with particle sizes of 10 or less, 20 to 45, 45 to 105, 45 to 180, 45 to 300 and 45 to 500 microns. These powders are mixed, stirred and granulated 1.5 to 3.0% by weight of liquid epoxy resin as bonding material, and 0.2% by weight of oleic acid as lubricating agent. Next the granulated powder is compression molded at 1 GPa in a metal mold, and the resin is cured by heating for 1 hour at 150° C. to obtain a molded magnet with the dimensions of external diameter 18 mm, internal diameter 16 mm and length 3 mm. Next, 1.5 micron $TiO_2$ powder is mixed with epoxy resin powder in the ratio 1:1 by mass, and this mixture is placed, together with the molded magnet and alumina balls, in a pot, where ball milling is performed for 10 minutes. Next, the molded magnet is shaken on a vibrating sieve to remove the excess $TiO_2$ and epoxy powder filler, and curing is then performed by heating at 150° C. for 30 minutes. Finally, after cleaning with purified water, an epoxy coating is sprayed on to give the magnet sample a corrosion resistant coat 20 microns in thickness. The surface roughness of the sample is measured by a surface roughness tester, and the magnetic characteristics are measured using a BH tracer. A corrosion resistance test evaluated the amount of corrosion present on the sample after 500 hours exposure to high temperature and high humidity (70° C. and 95% RH). The results of the test are shown in FIG. 5.

FIG. 5 shows how magnet surface roughness increases with an increase in magnetic powder particle size. Sample (f), with a particle size of 45 to 500 microns, gives an Ra of 3.9 microns, and after the corrosion resistance test, swellings could be observed on the surface. Underneath these swellings in the coating, it was found that red rust had occurred. On the other hand, with sample (a) of particle size 10 microns or less, surface roughness was slight and no evidence of rusting was found. However, since the particle size was too small, good forming density was not achieved and so the desired magnetic characteristics (BH) max were not obtained. Samples (b) to (e), with the magnetic powder particle size specified by the present invention of between 20 and 300 microns, achieved the desired magnetic characteristics and also satisfied the requirement for corrosion resistance. (Symbols used in FIG. 5: ○; no change, Δ; some swelling)

EXAMPLE OF EXECUTION 2

Quenched flakes of Nd—Fe—B are pulverized to obtain powder with particle sizes of 45 to 180 microns. When these powder are mixed, stirred and granulated 2.0% by weight of liquid epoxy resin as bonding material, and this granulated powder is compression molded in the same way as Example of Execution 1, and the resin is cured by heating for 1 hour at 150° C. to obtain a molded magnet with the dimensions of external diameter 18 mm, internal diameter 16 mm and length 3 mm. Next, 0.05 to 20 micron $SiO_2$ powder is mixed with epoxy resin powder in the ratio 2:1 by mass, and this mixture is placed, together with the molded magnet and alumina chips, into a planetary rotating pot, and rotated for 10 minutes. Next, the excess powder is removed, and curing is performed by heating at 150° C. for 30 minutes. Finally, after cleaning with purified water, a 15 micron thick epoxy coating is sprayed on and cured. The same corrosion resistance test as Example of Execution 1 was performed, the results of which are shown in FIG. 6.

FIG. 6 shows how magnet surface roughness depends on the particle size of the $SiO_2$ used as filler, and shows how this also affects the occurrence of rust. In sample (g), the $SiO_2$ particle size is too small, the spaces between magnet particles are not filled sufficiently and particles of filler accumulated on the surface so no improvement in surface roughness was achieved. On the other hand, in sample (m) the $SiO_2$ particle size is too large and only some of the spaces were filled. Samples (h) to (l), with the filling agent particle size specified by the present invention of between 0.1 and 15 microns, achieved the desired magnetic characteristics with no rust being generated. (Symbols used in FIG. 6: ○; no change, Δ; some swelling, X; red rust present)

EXAMPLE OF EXECUTION 3

Anisotropic Nd—Fe—B powder having an average particle size of 120 microns was mixed with 2.0% by weight of liquid epoxy resin and 0.2% by weight of stearic acid and stirred and granulated. Next, the granules were compression molded in a magnetic field of 800 kA/m at a pressure of 0.6 to 1.6 GPa and the resin cured by heating for 1 hour at 150° C. to obtain a molded magnet body with the dimensions of external diameter 12 mm and length 10 mm. In this case, the metal mold used has an interior surface roughness of the die of 0.6 microns, greater than the 0.1 micron of a normal lap grinder surface. The reason for this is to increase the friction of the molded body surface during the powder compression process and make it easy to remove excess magnetic powder positioned on the surface layer, the result being to make the surface roughness of the molded body smaller. The molded body was given an epoxy coating 15 microns thick, and this was used as the test sample. Test sample density and magnetic characteristics were measured, and the same corrosion resistance test as for Example of Execution 1 was performed, the results of which are shown in FIG. 7.

From FIG. 7, it can be seen that increasing the molding pressure improves the magnet density and the magnetic characteristics, surface roughness becomes smaller and rusting is suppressed. In test samples (n) and (o), the magnet density is not sufficient, so large spaces exist in the surface and surface roughness remains larger. These results show that samples (p) to (s) having surface roughness of 3 microns or less, as specified by the present invention, had good corrosion resistance. (Symbols used in FIG. 7: ○; no change, Δ; some swelling, X; red rust present)

The present invention has been described in connection with the above-mentioned embodiments, but it will be understood that various changes and applications can be made therein within the true spirit of the present invention, and these changes and applications are not excluded from the scope of the present invention.

In described above, the present invention provides a means for providing a clean, high performance magnet suitable for use in the drive motors of hard disk drives and cd-rom drives.

What is claimed is:

1. A resin bonded rare earth magnet comprising:

(a) a magnet body formed by compression molding a mixture of a first thermosetting resin and a rare earth-transition metal alloy powder having a particle size of between 20 and 300 microns such that the magnet body comprises powdered magnetic particles comprising the rare earth-transition metal alloy powder, said magnet body comprising a surface having depressions and projections;

(b) a filling material with a particle size of between 0.1 and 15 microns selectively fixed by a second thermosetting resin to the surface of the magnet body only in the depressions so as to cause the surface of the magnet body with the filling material to be smoother than the surface of the magnet body without the filling material, the surface of the magnet body with the filling material having a surface roughness of less than 3 microns; and (c) a corrosion inhibiting coat comprising a synthetic resin covering the surface of the magnet body with first portions of the corrosion inhibiting coat in contact with the powdered magnetic particles and second portions of the corrosion inhibiting coat in contact with the filling material.

2. The resin bonded rare earth magnet according to claim 1, wherein each of the first thermosetting resin and the second thermosetting resin is an epoxy resin.

3. A method of forming the resin bonded rare earth magnet of claim 1, comprising:

providing the magnet body by compression molding the first thermosetting resin and the particles of the rare earth-transition metal alloy powder having the particle size between 20 to 300 microns;

directly filling a mixture of the filling material with the particle size between 0.1 and 15 microns and the second thermosetting resin in powder form in depressions between the particles of the metal alloy powder and heat curing the powdered thermosetting resin to fix the filling material in the depressions such that the surface of the filled magnetic body has a surface roughness of less than 3 microns; and applying the corrosion inhibiting coat to the surface of the filled magnetic body.

* * * * *